(12) United States Patent
Nelson

(10) Patent No.: US 7,444,128 B1
(45) Date of Patent: Oct. 28, 2008

(54) METHOD OF ESTIMATING A HIGH FREQUENCY CARRIER SIGNAL

(75) Inventor: Douglas J. Nelson, Columbia, MD (US)

(73) Assignee: The United States of America as represented by the Secretary of the National Security Agency, Washington, DC (US)

( * ) Notice: Subject to any disclaimer, the term of this patent is extended or adjusted under 35 U.S.C. 154(b) by 549 days.

(21) Appl. No.: 11/340,820

(22) Filed: Jan. 19, 2006

(51) Int. Cl.
*H04B 17/00* (2006.01)

(52) U.S. Cl. ............... 455/226.1; 455/150.1; 455/210; 375/316; 375/320

(58) Field of Classification Search ............ 455/150.1, 455/151.1, 151.2, 161.1, 210, 214, 226.1, 455/227; 375/316, 320
See application file for complete search history.

(56) References Cited

U.S. PATENT DOCUMENTS

| 5,684,842 | A | 11/1997 | Daffara |
| 5,732,113 | A | 3/1998 | Schmidl et al. |
| 5,982,809 | A | 11/1999 | Liu et al. |
| 6,031,884 | A | 2/2000 | Pon |
| 6,091,786 | A | 7/2000 | Chen et al. |
| 6,181,714 | B1 | 1/2001 | Isaksson et al. |
| 6,484,112 | B1 | 11/2002 | Scheppach |
| 6,577,968 | B2 | 6/2003 | Nelson |
| 6,771,937 | B2 | 8/2004 | Doetsch et al. |
| 6,839,388 | B2 | 1/2005 | Vaidyanathan |
| 6,882,691 | B2 | 4/2005 | Chiodini |

OTHER PUBLICATIONS

U.S. Appl. No. 11/151,173, Nelson.

K. Kodera, R. Gendrin, and C. De Villedary, Analysis of Time-varying Signals with Small BT Values, IEEE Trans. Acoust. Speech and Signal Processing, vol. 26, 1978, pp. 64-76.

S.M. Kay, Statistically/Computationally Efficient Frequency Estimation Proceedings of the IEEE Conference on Acoustics, Speech and Signal Processing, 1988, pp. 2292-2295.

Douglas Nelson, Special Purpose Correlation Functions for Improved Signal Detection; and Parameter Estimation, Proceedings of the IEEE Conference on Acoustics, Speech, and Signal Processing, Apr. 1993, pp. 73-76, Minneapolis, MN USA.

(Continued)

*Primary Examiner*—Tony T Nguyen
(74) *Attorney, Agent, or Firm*—Eric Froelich

(57) ABSTRACT

A method of estimating the carrier frequency of a signal is disclosed. The method comprising the steps of initializing a time average vector to zero, selecting a user-selectable time segment to divide a received signal into. A signal is received, and divided into the user-selectable time segments. A spectral peak vector is calculated by performing a spectral estimation process on the user-selectable time segment divided signal. A first correlation vector is calculated on the spectral peak vector, and a second correlation vector is calculated from the spectral peak vector and the first correlation vector. The time average vector is appended with the result from the second correlation vector, and the process repeats for each time segment the received signal was broken into. The carrier is estimated using the most commonly occurring frequency in the time average vector.

7 Claims, 6 Drawing Sheets

OTHER PUBLICATIONS

F. Auger and P. Flandrin, Improving the Readability of Time-Frequency and Time-Scale Representations by the Reassignment Method, IEEE Trans. Sig. Processing, vol. 43, No. 5, May 1995, pp. 1069-1089.

Douglas Nelson and Joseph Pencak, Pitch Based Methods for Speech Detection and Automatic Frequency Recovery, SPIE Proc. Adv. Sig. Proc. Algorithms, vol. 2563, Jul. 10-12, 1995, pp. 92-100, San Diego, CA, USA.

Douglas Nelson, Cross Spectral Methods for Processing Speech, Journal of the Acoustic Society of America, vol. 110, No. 5, pt. 1, Nov. 2001, pp. 2575-2592.

Douglas Nelson, Cross-Spectral Based Formant Estimation and Alignment, IEEE Proc ICASSP, Apr. 2004, Montreal, Canada.

Douglas Nelson and D.C. Smith, Linear Distributions of Signals, SPIE Proc. Adv. Sig. Proc. Algorithms, vol. 2563, 2004, Denver, CO, USA.

METHOD OF ESTIMATING A HIGH FREQUENCY CARRIER SIGNAL

FIELD OF THE INVENTION

The present invention relates, in general, to speech signal processing, and, in particular to carrier frequency estimation by analyzing the waveform using Fourier analysis.

BACKGROUND OF THE INVENTION

In High Frequency (HF) communications, the carrier is normally not transmitted with the signal. Such a suppressed carrier signal is more efficient to transmit, since the signal bandwidth is reduced. However, carrier suppression makes it more difficult for the receiver to properly demodulate the signal. In tuning a HF receiver, the process is the same as used to tune an AM radio dial to an AM station. The primary difference is that AM radio station's broadcast on a precisely known, assigned carrier frequency.

By contrast, HF radios do not operate on assigned frequencies. Operators must either agree on a carrier frequency before transmission, or the operator must manually tune the receiver until the signal "sounds right."

U.S. Pat. No. 5,684,842, entitled "DIGITAL TRANSMISSION SYSTEM COMPRISING A RECEIVER WHICH INCLUDES A CARRIER RECOVERY CIRCUIT," discloses a method removing phase jitter from a carrier signal. The correction is estimated using the known carrier frequency, or one that has been encoded by an agreed upon constellation scheme, and the correction is based on the phase difference of the received signal. The expected carrier signal is transmitted along with the signal or agreed to in advance. The present invention is not limited in this regard. U.S. Pat. No. 5,684,842 is hereby incorporated by reference into the specification of the present invention.

U.S. Pat. No. 5,982,809, entitled "METHOD AND APPARATUS FOR CARRIER RECOVERY AND COMPENSATION IN SPREAD SPECTRUM COMMUNICATIONS," discloses a method estimating the carrier frequency in spread spectrum communications. The spread-spectrum communications signal is demodulated to remove the expected carrier frequency, and a phase change of demodulated signal is calculated. The average phase change is used to estimate the carrier offset. In spread-spectrum communications, an expected carrier frequency is transmitted along with the signal. The present invention is not limited in this regard. U.S. Pat. No. 5,982,809 is hereby incorporated by reference into the specification of the present invention.

U.S. Pat. No. 6,091,786, entitled "METHOD AND APPARATUS IN A COMMUNICATION RECEIVER FOR ESTIMATING SYMBOL TIMING AND CARRIER FREQUENCY," discloses a method estimating the carrier frequency using a rough estimation from symbol timing. The selected carrier frequency is estimated by using predetermined variations of the carrier frequency about a nominal carrier frequency as a function of predetermined variations in symbol timing about the rough symbol timing. U.S. Pat. No. 6,091,786 is hereby incorporated by reference into the specification of the present invention.

U.S. Pat. No. 6,577,968, entitled "METHOD OF ESTIMATING SIGNAL FREQUENCY," discloses a method of estimating signal frequency by forming a cross spectrum matrix of the received signal, and selecting the magnitude in the matrix that is above a pre-determined threshold. The cross spectrum matrix is determined by taking the received signal, forming a row vector, converting the row vector into a first matrix, multiplying the first vector by a weight, taking a Fourier transform, and calculating a complex conjugate. The angular frequency of the signal is set to either the phase of the selected magnitude, the phase of the mean of the complex numbers in the row where the selected magnitude appears, or the selected magnitude. The frequency of the signal is set to the estimated angular frequency divided by the product of $2\pi$ and the signal delay period. U.S. Pat. No. 6,577,968 is hereby incorporated by reference into the specification of the present invention.

U.S. Pat. No. 6,771,937, entitled "FREQUENCY-STABILIZED TRANSMITTING/RECEIVING CONFIGURATION," discloses a device for correcting frequency of a received signal, especially when the received signal is moving towards or away from the receiver. The device assumes the only signal mismatch is due to the Doppler frequency shift. A known carrier frequency is assumed, and only the correction due to Doppler shifts need to be calculated. The present invention is not directed to the case where the carrier frequency is known and only the Doppler shift needs to be calculated and applied to the received signal. U.S. Pat. No. 6,771,937 is hereby incorporated by reference into the specification of the present invention.

U.S. Pat. No. 6,839,388, entitled "SYSTEM AND METHOD FOR PROVIDING FREQUENCY DOMAIN SYNCHRONIZATION FOR SIGNAL CARRIER SIGNALS," discloses a method of fine-tuning a carrier frequency. The method assumes a course carrier frequency has already been determined. The present invention is not lacking in this regard. U.S. Pat. No. 6,839,388 is hereby incorporated by reference into the specification of the present invention.

U.S. Pat. No. 6,882,691, entitled "FINE-FREQUENCY OFFSET ESTIMATION," discloses a method of fine-tuning a carrier frequency. The method assumes a course carrier frequency has already been determined. The present invention is not lacking in this regard. U.S. Pat. No. 6,882,691 is hereby incorporated by reference into the specification of the present invention.

U.S. patent application Ser. No. 11/151,173 entitled "METHOD OF REMOVING NOISE AND INTERFERENCE FROM SIGNAL USING PEAK PICKING" discloses a method of removing noise and interference from a signal. The method calculates a short time Fourier transform, and estimates a noise free and interference free signal by integration. U.S. patent application Ser. No. 11/151,173 is hereby incorporated by reference into the specification of the present invention.

Other known patents include:

U.S. Pat. No. 5,732,113 to Schmidl et al.;

U.S. Pat. No. 6,031,884 to Pon; and

U.S. Pat. No. 6,181,714 to Isaksson et al.; and

U.S. Pat. No. 6,484,112 to Scheppach.

Known non-patent publications include:

Analysis of Time-varying Signals with Small BT Values, K. Kodera, R. Gendrin, and C. de Villedary, IEEE Trans. Acoust. Speech and Signal Processing, vol. 26, pp. 64-76, 1978;

Statistically/Computationally Efficient Frequency Estimation, S. M. Kay, Proceedings of the IEEE Conference on Acoustics, Speech and Signal Processing, pp. 2292-2295, 1988;

Special Purpose Correlation Functions for Improved Signal Detection; and Parameter Estimation, Douglas Nelson, Proceedings of the IEEE Conference on Acoustics, Speech, and Signal Processing, Minneapolis, pp. 73-76, April, 1993;

Improving the Readability of Time-Frequency and Time-Scale Representations by the Reassignment Method, F. Auger and P. Flandrin, IEEE Trans. Sig. Proc., vol. 43, no. 5, pp. 1069-1089, May, 1995;

Pitch Based Methods for Speech Detection and Automatic Frequency Recovery, Douglas Nelson and Joseph Pencak, SPIE Proc Adv. Sig. Proc. Algorithms, vol. 2563, pp. 92-100, San Diego, 10-12 July, 1995;

Cross Spectral Methods for Processing Speech, Douglas Nelson, Journal of the Acoustic Society of America, vol. 110, no. 5, pt. 1, pp. 2575-2592, November 2001;

Cross-Spectral Based Formant Estimation and Alignment, Douglas Nelson, IEEE Proc. ICASSP, Montreal, April, 2004; and Linear Distributions of Signals, Douglas Nelson and D. C. Smith, SPIE Proc Adv. Sig. Proc. Algorithms, vol. 2563, Denver, 2004.

SUMMARY OF THE INVENTION

It is an object of the present invention to provide a method of estimating the carrier frequency of a High Frequency signal.

The first step of the present invention is initializing a time average vector to zero.

The second step is selecting a user-selectable time segment.

The third step is receiving a signal, and dividing the signal into said user-selectable time segments.

The fourth step is calculating a spectral peak vector, the spectral peak vector calculated from a spectral estimation process on the user-selectable time segment divided signal.

The fifth step is calculating a first correlation vector on the spectral peak vector, the first correlation vector calculated from a first correlation process.

The sixth step is calculating a second correlation vector, the second correlation vector calculated from the spectral peak vector and said first correlation vector.

In the seventh step, the second correlation vector is appended to the time average vector.

In the eighth step, repeating steps four through seven for each of the user-selectable number of segments of the received signal.

In the ninth, and last step, calculating the carrier estimate, the carrier estimate is the most commonly occurring frequency in the time average vector.

DETAILED DESCRIPTION

Figure 1:
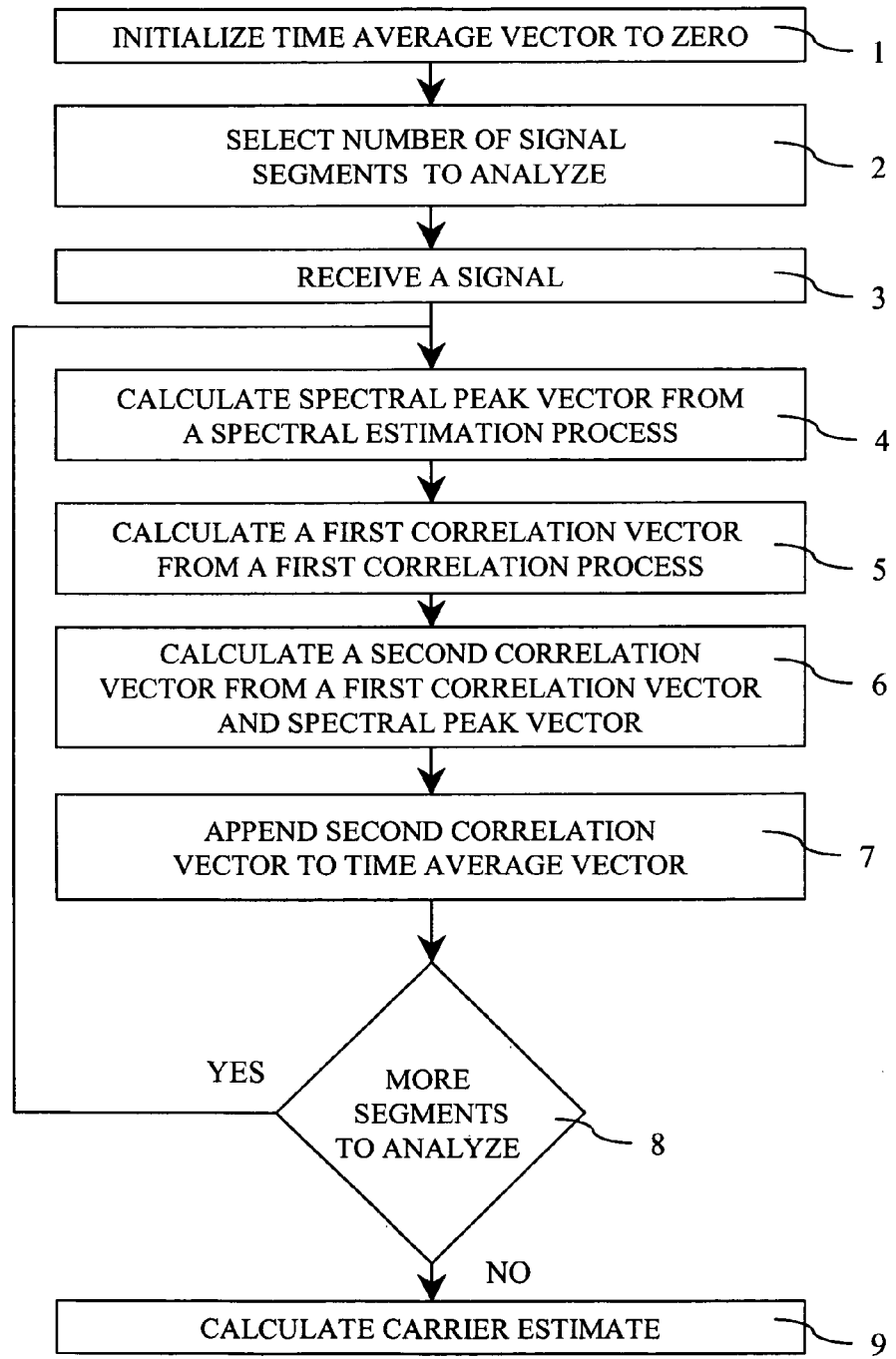
FIG. 1 is a flowchart of the steps of the present invention.

The present invention is a novel method of estimating the carrier frequency of a HF single sideband signal from the structure of the underlying speech signal.

The present invention is based on a cross-spectrum, which is a time-frequency surface computed as the product of the short time Fourier transform (STFT) of the signal and the complex conjugate of the STFT of the delayed signal. A STFT is a known method of forming a matrix of complex values that represent the signal, where the columns (or rows) of the matrix are discreet time, and the rows (or columns) of the matrix are discreet frequency. The cross-spectrum representation is complex valued, with a magnitude equal to the spectrogram and the argument (phase) essentially equal to the argument of the STFT differentiated with respect to time. The advantage of this representation is that algebraic operations like addition, multiplication, and matrix multiplication may be applied to such cross-spectral representations, and the results may be easily interpreted as operations on the signal. An additional advantage of this notation is that the instantaneous frequencies of individual signal components are encoded in the value of the time-frequency surface at each point or coordinate.

Since each surface element retains frequency information, it is not necessary to process the entire time-frequency surface or retain the order of the surface components to estimate signal parameters. Only the high energy components need be processed. Low energy components may be discarded, and the remaining elements may be stored in any order.

The present method follows the convention that lowercase letters (e.g. s(t)) represent the time-domain functions, uppercase letters (e.g. S($\omega$)) represent frequency domain functions, and bold uppercase letters (e.g. S($\omega$, T)) represent time-frequency surfaces. The cross-spectral time-frequency surface is computed as the product of the short time Fourier transform (STFT) of the signal and the complex conjugate of the short time Fourier transform of the delayed signal.

The present method makes use of a representation in which the estimated frequency is encoded as the argument of a complex-valued surface. Surfaces will be described in the format above (e.g. S($\omega$, T)) and will be referred to as a cross-spectral surface.

For a signal, s(t), the Fourier transform is computed as $$S(\omega) = \int_{-\infty}^{\infty} s(t) e^{-i\omega t} dt \tag{1}$$

where $\omega$ is angular frequency. The STFT is computed as the Fourier transform of short time-translated segments of the signal and may be represented as $$S_h(\omega, T) = \int_{-\infty}^{\infty} s(t+T) h(-t) e^{-i\omega t} dt \tag{2}$$

It is assumed that h(−t) and its Fourier transform H($\omega$) are both real, symmetric, zero-mean, and have small variance.

A cross-spectral surface representation to estimate the frequencies of stationary signals is used. Stationary signals are signals whose frequency does not change with time. This representation encodes the spectrogram as its magnitude and has an argument that is essentially the phase of the STFT differentiated with respect to time.

$$S_{cs}(\omega, T) = S_h\left(\omega, T + \frac{\varepsilon}{2}\right) S_h^*\left(\omega, T - \frac{\varepsilon}{2}\right) \tag{3}$$

-continued $$|S_{cs}(\omega, T)| \approx |S_h(\omega, T)|^2 \quad (4)$$

$$\frac{1}{\varepsilon}\arg\{S_{sc}(\omega, T)\} \approx \frac{\partial}{\partial T}\arg\{S_h(\omega, T)\} \quad (5)$$

$\varepsilon$ is omitted from the notation with the understanding that $\varepsilon$ is very small. For digital implementations, $\varepsilon$ is set to be equal to one sample.

For a multi-component signal, which may be represented as the sum of narrowband components, the STFT is defined to be separable at $(\omega_o, T_o)$ if only one signal component contributes a significant amount of energy to $S_h(\omega_o, T_o)$. At a fixed separable point, $(\omega_o, T_o)$ equation (5) approximates the instantaneous frequency at time, $T_o$, of whichever signal component is within the passband of the filter whose frequency response is $H(\omega-\omega_o)$. When the magnitude of $S_{sc}(\omega_o, T_o)$ is large, equation (5) provides an estimate of the instantaneous frequency of the dominant signal component at $(\omega_o, T_o)$.

FIG. 1 is a flowchart of the steps of the present invention.

The first step 1 of the present method is initializing a time average vector to zero.

The second step 2 in the present method is selecting the number of segments to divide a signal into.

In the preferred embodiment, a windowing function, h(t) whose standard deviation is approximately twice the expected glottal pulse period is selected. The present invention does not critically depend on the choice of window. In practice, a nominal 40 ms Hanning window is used. Persons skilled in the art will recognize that the choice of window is user-selectable, as long as the segment catches two or more pitch pulses.

The third step 3 of the present invention is receiving a signal and dividing the received signal into the number of segments selected in step two 2.

In the present invention, a clean voiced signal, s(t) is observed when a vocal tract is excited by an excitation function, p(t), consisting of a sequence of glottal pulses. The vocal tract acts as a filter, in which the excitation function is convolved with the impulse response of the vocal tract, v(t). Both the frequency of occurrence of the glottal pulses and the impulse response of the vocal tract change slowly as a function of time. The signal therefore has the representation $$s(t)=p(t)*v(t), \text{ where "*" is convolution} \quad (6)$$

$$S_{sc}(\omega,T)=P_h(\omega,T)V_h(\omega,T) \quad (7)$$

For a sequence of glottal pulses modeled as impulses with a slowly varying repetition frequency $\Omega_o(T_o)$ the STFT for voiced speech may be modeled as $$S_{sc}(\omega, T) = \left(\left(\sum_{n=1}^{\infty} A_n(T)\tilde{\Delta}\right) *_\omega H(\omega)\right) V_h(\omega, T) \quad (8)$$

where $A_n(T) \geq 0$, $\Delta=\delta(\omega-n\Omega_n(T))$, $\delta$ is the Dirac delta function, and "$*_\omega$" is convolution with respect to the frequency variable $\omega$.

As long as the magnitude of each component is relatively large, the magnitude of each component does not matter. In the present method, the phase of the surface is important, but because the vocal tract is non-dispersive, it is assumed that the vocal tract does not contribute significantly to the observed phase of the STFT. It is also assumed that the standard deviation of $H(\omega)$ is smaller than $\Omega_0$, in which case the spreading of each pitch harmonic by the convolution with $H(\omega)$ is small enough that the pitch harmonics observed in the STFT are separable. The STFT becomes $$S_h(\omega, T) = \sum_{n=1}^{\infty} B_n(T)\delta(\omega - n\Omega_0(T))*_\omega H(\omega), \; B_n(T) \geq 0 \quad (9)$$

The received signal is modeled as $$\tilde{s}(t) = e^{j\omega_c t}s(t) + \upsilon(t) \quad (10)$$

$$\tilde{S}_h(\omega, T) = S_h(\omega - \omega_c, T) + \eta_h(\omega, T) \quad (11)$$

$$= \sum_{n=1}^{\infty} B_n(T)\tilde{\delta}_n *_\omega H(\omega) + \eta_h(\omega - \omega_c, T) \quad (12)$$

where $\tilde{\delta}_n = \delta(\omega-\omega_c-n\Omega_0(T))$, s(t) is the analytic representation of the baseband signal, $\omega_c$ is the unknown carrier offset, and $\upsilon$ and $\eta_k$ are the combined noise and interference in the received signal and the STFT of the received signal, respectively. It is not assumed that $\eta_h(\omega, T)$ is white, but it is assumed that it does not correlate with the signal.

The goal is to estimate the carrier offset, $\omega_c$, from equation (12). The present invention uses the fact that pitch, $\Omega_0(t)$, is non-stationary to obtain an over-determined system of equations from which we may "solve" for $\omega_c$; however, for an accurate estimate of the carrier, one must effectively remove the effects of the window function, $H(\omega)$, from equation (12). In addition, very accurate estimates of the pitch fundamental, $\Omega_0(t)$, are needed. These estimates must be made from very short segments of data, or the non-stationarity of $\Omega_0(t)$ will affect the accuracy of the estimate $\omega_c$.

The fourth step 4, is calculating a spectral peak vector. The spectral peak vector is calculated from a spectral estimation process performed on the signal.

Figure 2:
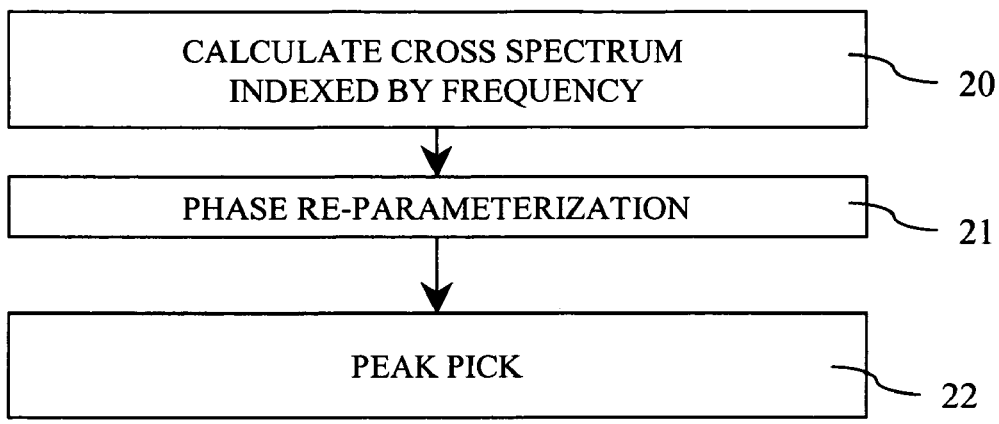
FIG. 2 is a flowchart of the steps of calculating a spectral peak vector.

Preferably, step four 4 includes three sub-parts as shown in FIG. 2; calculation of a cross-spectrum indexed by frequency 20, a phase re-parameterization 21, and a peak picking operation 22.

Figure 3:
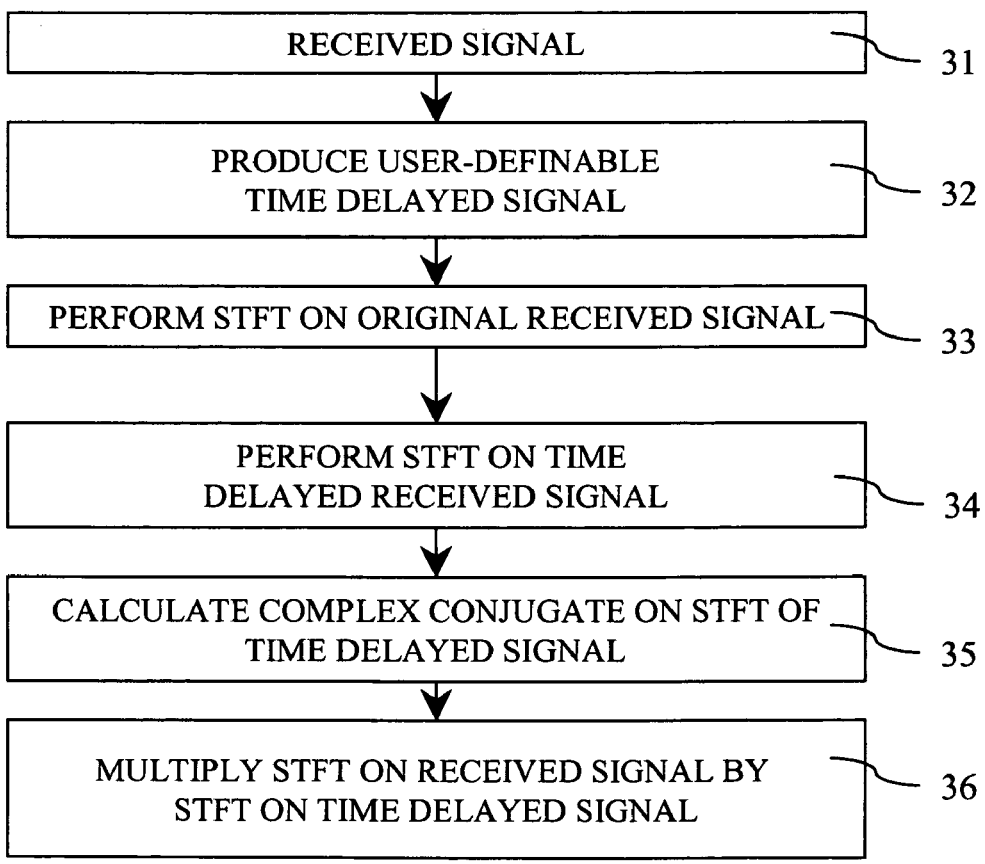
FIG. 3 is a flowchart of the steps of calculating a cross-spectrum indexed by frequency.
Figure 4:
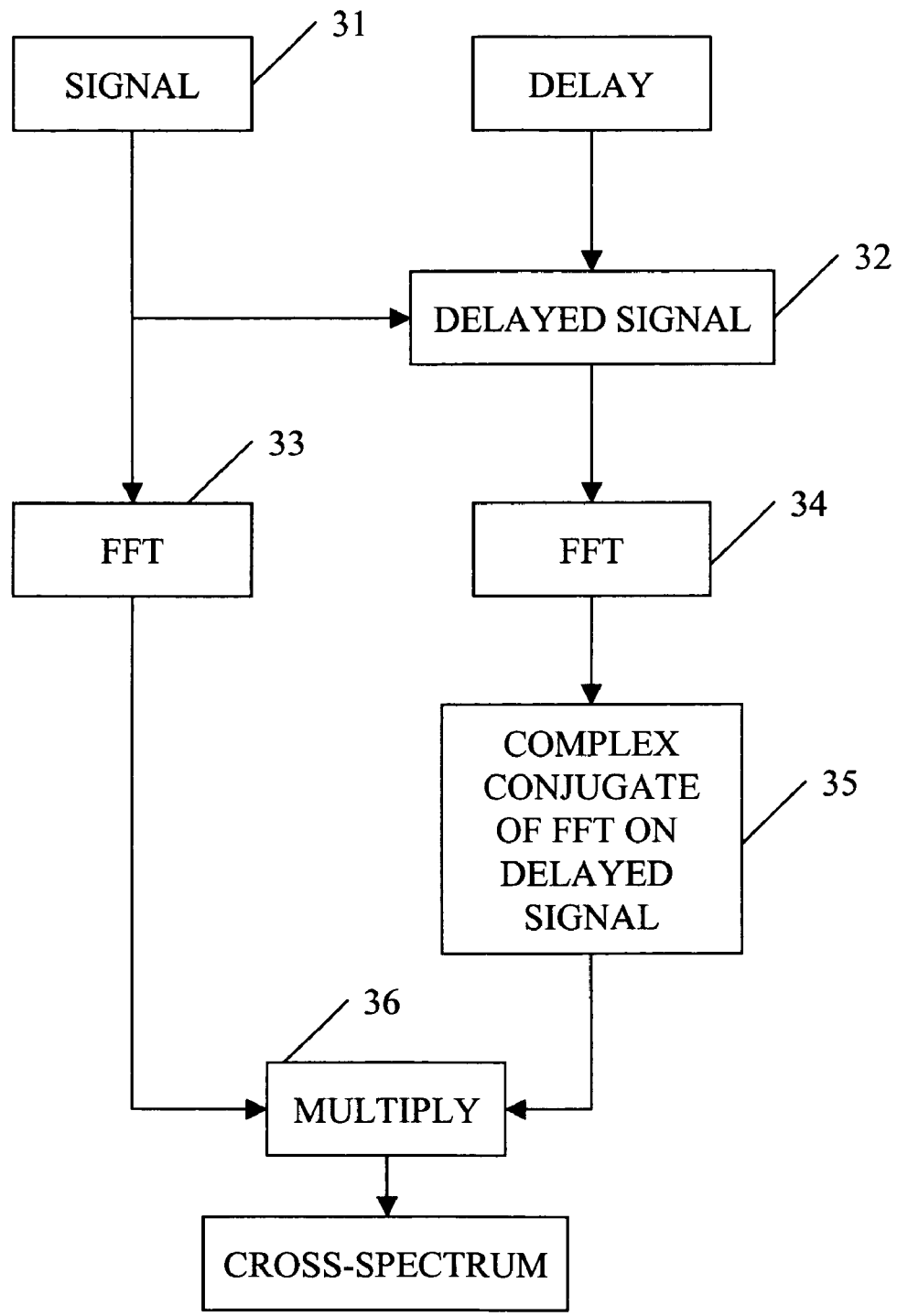
FIG. 4 is a graphical representation of FIG. 3.

The preferred method of calculating a cross-spectrum performed on the received signal is shown as a flowchart in FIG. 3, and graphically represented in FIG. 4.

The received signal 31 is an input to the sub-process. A time-delayed signal is produced 32 from the received signal 31. The time-delayed signal 32 is delayed by a user-definable time delay.

A first STFT 33 is performed on the received signal. Next, a second STFT 34 is performed on a time-delayed signal 32. Persons skilled in the art will recognize that the STFT is calculated using the segment-sized portion of the received signal 31, and performing a Fourier transform on the selected portion of the received signal 31.

The complex conjugate 35 is calculated on the second STFT 34.

The last step 36 of calculating the cross spectrum is multiplying the first STFT 33 by the complex conjugate of the time-delayed (second) STFT 35.

Referring again to FIG. 2, in the preferred embodiment, after a cross spectrum is calculated 20, a phase re-parameterization is computed 21.

In the preferred embodiment, the present method uses the cross-spectral/reassignment method, using the delay-conjugate-multiply implementation described above to effectively remove the spreading effects of the window.

Normally in reassignment, a winner-take-all (WTA) strategy is employed. In the WTA approach, the entire contribution of a surface component is placed at its reassigned coordinate. In the present method, a phase re-parameterization variation in which the reassigned contribution is weighted by a local compression factor which de-weights a contribution if the reassigned frequency is random.

The method is briefly described. For any surface, $S_{cs}(\omega, T)$, we assume only that $\arg\{S_{sc}(\omega, T)\}$ represents a frequency value as estimated at $(\omega_0, T_0)$. The phase re-parameterization surface then has the representation $$\tilde{S}_{sc}(\omega_\Phi, T_0) = \Sigma_{\omega=\omega_\Phi} S_{sc}(\omega, T_0) W(\omega, T_0) \tag{13}$$

where $W(\omega, T_0)$ is large if $\arg\{S_{sc}(\omega,T)\}$ is not random and small if $\arg\{S_{sc}(\omega,T)\}$ is random.

The third sub-process of calculating a spectral peak vector 4 shown in FIG. 1 is performing a peak picking operation 22 shown in FIG. 2.

The preferred method of performing the peak picking operation 22 is described in commonly owned U.S. patent application Ser. No. 11/151,173.

U.S. patent application Ser. No. 11/151,173 discloses a method of removing noise and interference from a signal by receiving the signal, calculating a joint time-frequency domain of the signal, estimating instantaneous frequencies of the joint time-frequency domain, modifying each estimated instantaneous frequency, if necessary, to correspond to a frequency of the joint time-frequency domain to which it most closely compares, redistributing the elements within the joint time-frequency domain according to the estimated instantaneous frequencies as modified, computing a magnitude for each element in the joint time-frequency domain as redistributed, plotting the results as the time-frequency representation of the signal, identifying peak values in the plot, eliminating from the redistributed joint time-frequency domain elements that do not correspond to the peak values, identifying noise and interference in the peak values, eliminating the noise and interference from the redistributed joint time-frequency domain elements, and recovering a signal devoid of noise and interference from the modified redistributed joint time-frequency domain.

Other methods of recovering a signal devoid of noise and interference may be used without deviating from the inventive concept of the present invention.

Referring again to FIG. 1, the fifth step 5, is calculating a first correlation vector on said spectral peak vector, said first correlation vector calculated from a first correlation process.

To calculate a correlation vector, an outer-product correlation function is used. The outer product of two column vectors, A and B, may be represented as $$C = AB^*$$

where "*" represents the complex-conjugate transpose. For cross-spectral surfaces, the outer-product of the two surfaces at each time, $T_0$ is represented as $$C(\omega, \zeta, T_0) = A(\omega, T_0) B^*(\zeta, T_0) \tag{16}$$

$$|(\omega, \zeta, T_0)| = |A(\omega, T_0)||B(\zeta, T_0)| \tag{17}$$

$$\arg\{C(\omega, \zeta, T_0)\} = \arg\{A(\omega, T_0)\} - \arg\{B(\zeta, T_0)\} \tag{18}$$

It is assumed that the arguments of $A(\omega,T)$ and $B(\omega,T)$ represent encoded frequency. The outer product $C(\omega, \zeta, T_0)$ is three dimensional, indexed by two frequency coordinates, $\omega$, $\zeta$, and time $T_0$. The argument $C(\omega, \zeta, T_0)$ represents the frequency differences of component pairs, and each $T_0$, we may pool all surface components $C(\omega, \zeta, T_0)$ and apply phase re-parameterization to compute a new 2-dimensional correlation surface.

The first correlation process, at each time $T_0$, receives the spectral peak vector from step four 4, and for each index, m, and each index, n, a correlation matrix, CPRmat, is computed by iterating the matrix element CPRmat(m,n) by multiplying element spectral peak vector (m) by the complex conjugate of element spectral peak vector(n). This is iterated for each index m and each index n.

The elements of the correlation matrix are rearranged into a correlation vector.

The sixth step 6 of the present method is calculating a second correlation vector, the second correlation vector calculated from the spectral peak vector, and the first correlation vector.

The second correlation vector is calculated in a similar method as the first correlation vector from step five 5. The inputs are the spectral peak vector from step four 4 and the first correlation vector from step five 5.

The seventh step 7 is appending the second correlation vector to the time average vector.

The eighth step 8 is repeating step four 4 through step seven 7 for each of the user-selectable number of segments of the received signal. After each of the user-selectable number of segments of the received signal is processed, an accumulated time average vector results.

In the ninth, and last step 9, the carrier estimate is calculated. The carrier estimate is the most commonly occurring frequency in the accumulated time average vector.

Figure 5:
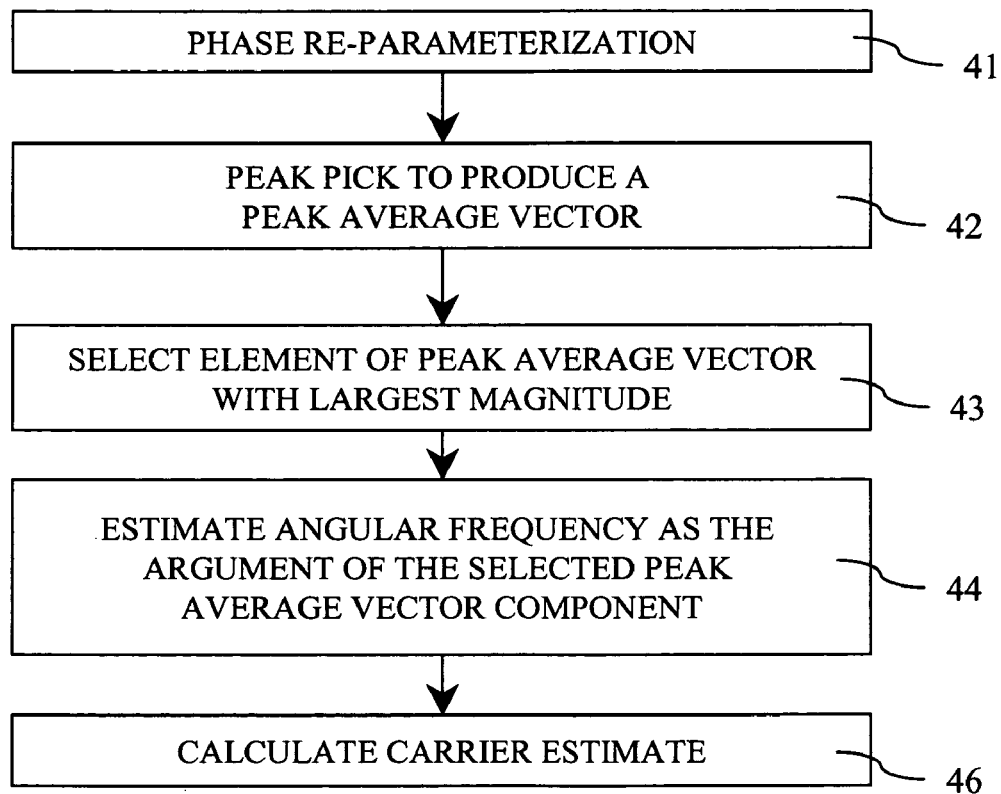
FIG. 5 is a flowchart of the steps of calculating the estimate of carrier frequency.

The carrier estimation process is shown in FIG. 5.

The accumulated time average vector from step eight 8 is passed through a phase re-parameterization sub-process 41 as described above. The carrier offset is estimated by peak picking the phase re-parameterized accumulated time average vector. $\omega_c$ is estimated as the argument of the peak having the largest magnitude.

Figure 6:
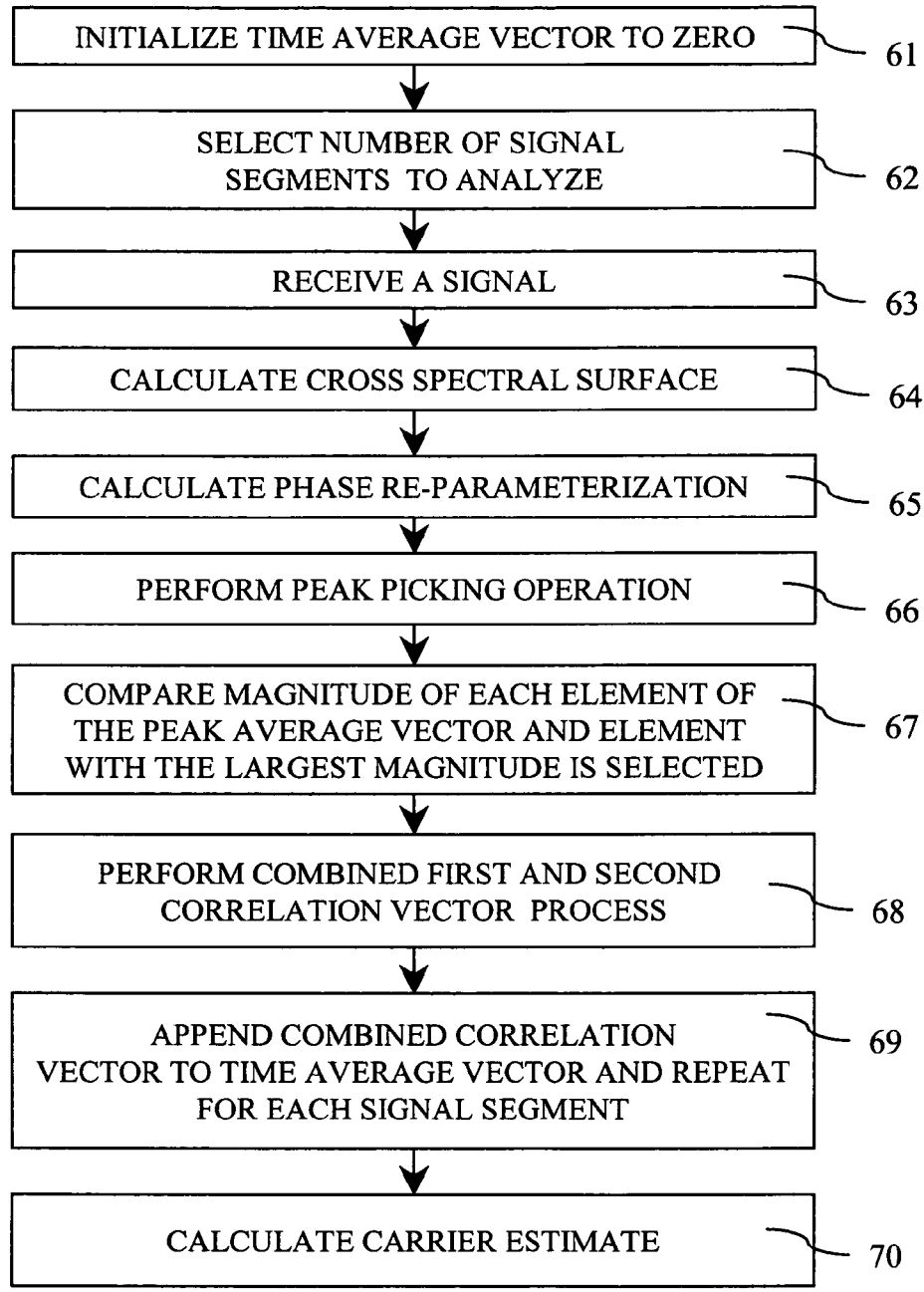
FIG. 6 is a flowchart of an alternate method of the present method.
Figure 7:
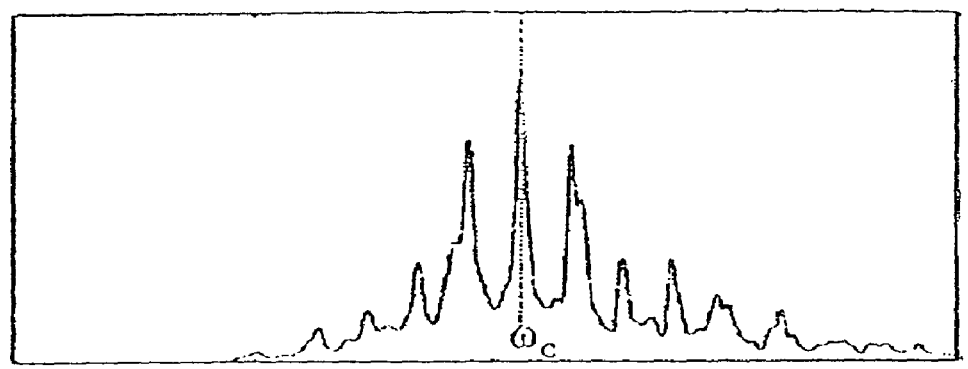
FIG. 7 is a graph of experimental data using the present method.

An alternate, more efficient, method of practicing the present invention is shown in FIG. 6.

The first step 61 is initializing a time average vector to zero.

The second step 62 is selecting a user-selectable time segment.

The third step 63 is receiving a signal and dividing the received signal into the number of segments selected in step two 62.

The fourth step 64 is calculating the cross-spectral surface $S_{cs}(\omega,T)$ as described in equation 3.

In the fifth step 65, phase re-parameterization from equation (13), is applied to produce the surface $S_{cs}(\omega,T)$. Because re-parameterization pitch harmonics are concentrated in frequency, effectively removing the frequency uncertainty, the present method removes the window, h, from the notation.

The sixth step 66, is peak picking $S_{cs}(\omega\omega_0)$ at each time, $T_0$ retaining only the K surface components with the largest peak magnitude at each time. This is the same method described above, described as the third sub-process.

$$\tilde{S}_k(T_0) \equiv \tilde{S}_{cs}(\omega_k, T_0) \tag{19}$$

$$|\tilde{S}_k(T_0)| \geq |\tilde{S}_l(T_0)|, k<l \tag{20}$$

$$\tilde{S}(T_0) \equiv (\tilde{S}_l(T_0), \ldots \tilde{S}_K(T_0))^T \tag{21}$$

where "T" represents the matrix transpose, and it is assumed that $S_{cs}(\omega_k,T_0) > |S_{cs}(\omega_k \pm \epsilon, T_0)|$. This produces a peak average vector. Among the K largest components, it is assumed that there are several of the stronger pitch harmonics. If one assumes that for a particular value of k the peak value $S_k(T_0)$ represents the $n^{th}$ pitch harmonic, you have $$\arg\{\tilde{S}_k(T_0)\} = n_k \omega_0(T_0) + \omega_c \quad (22)$$

where the harmonic number, n, pitch fundamental, $\omega_0(T)$, and the carrier offset, $\omega_c$, are unknown.

In the present invention, it is not expected that any of the peaks represent the pitch fundamental, but it is expected there will be peaks representing several low harmonics and it is also expected that there will be several consecutive harmonics among the peaks.

Since the estimated frequency of each component is encoded in its argument, it is not necessary to retain the frequency index of each of the peak components, and the peaks may be stored in any order. In the present invention, reference to frequency ($\omega$) is removed from the notation.

For convenience, it is assumed that the peak components are stored in a column vector in order of descending magnitude. By retaining only several peak values, the frequency dimension of the surface is greatly reduced.

In the seventh step 67, the magnitude of each element of the peak average vector is compared and the element with the largest magnitude is selected. The angular frequency of the carrier is estimated as the argument of the selected peak average vector component.

The signal sample rate, sample_rate is inputted, and the carrier frequency is estimated as $$\text{carrier} = \frac{(\text{sample\_rate} * \text{angular\_frequency} * \text{delay})}{2\pi} \quad (23)$$

In the eighth step 68, the processing on the first and second correlation vectors is combined. Two applications of the outer product are performed to obtain $$\tilde{S}_{ijk}(T_0) = \tilde{S}_i(T_0)\tilde{S}_j^*(T_0)\tilde{S}_k(T_0) \quad i,j,k=1,\ldots,K \quad (24)$$

If i, j, and k are all indexes representing pitch harmonics in vector $S(T_0)$, we have the condition $$\arg\{\tilde{S}_{ijk}(T_0)\} = M_{ijk}\Omega_0 + \omega_c \quad (25)$$

where $M_{ijk} = m_i - m_j + m_k$ and $m_i$, $m_j$, and $m_k$ are the harmonic numbers of the $i^{th}$, $j^{th}$, and $k^{th}$ peak components, respectively. The values of $M_{ijk}$, $\Omega_0$, and $\omega_c$ are unknown, but if consecutive harmonics are represented in the vector, $S(T_0)$, then $$M_{ijk}=0, \text{ for some i, j, and k} \quad (26)$$

In the ninth step 69, the combined first and second correlation vector process from step eight 68 is appended to the time average vector. Since the order of the elements of $S_{ijk}(T_0)$, for a fixed ($T_0$) is not of interest, the elements are rearranged to convert from a three dimensional array to a single column vector $\hat{S}(T_0) = (\hat{S}_1(T_0), \ldots \hat{S}_L(T_0))^T$. It is observed that $\Omega_0(T)$ is not stationary. Therefore, a time interval I=[A, B) is selected. For a digital implementation, T is quantized, and $\hat{S}(T_n)$, $T_n \epsilon I$ is an array. In a digital implementation, this array is pooled into a single vector by concatenating each of the vectors and sorting in ascending order of argument. Simplifying the notation, the vector is $$\hat{S}_f = (\hat{S}_1(T_0) \ldots \hat{S}_L(T_0), \ldots, \hat{S}_L(T_N), \ldots, \hat{S}_L(T_N))^T,$$
$$T_N \epsilon I \text{ for } n=0 \ldots N \quad (27)$$

In the tenth step 70, $\hat{S}_f$ is re-parameterized by phase by applying equation 13. The vector must be sorted by its argument, and the value of the derivative in the denominator is estimated from the argument of the product of each element and the complex conjugate of an adjacent element. The phase re-parameterized surface has the representation $$\tilde{S}(\omega_\Phi, T_0) = \sum_{\omega \in \omega_\Phi} \frac{S_{cs}(\omega, T_0)}{\max\left(\xi, \left|\frac{\partial}{\partial \omega}\arg\{S_{cs}(\omega, T_0)\}\right|\right)}$$

where $\omega_{\omega\Phi} = \{\omega | \arg[S_{cs}(\omega,T_0)] = \Phi\}$ and $\xi$ is a user defined positive constant. With this re-parameterization, a bulge at the carrier offset, $\omega_c$, is produced, since the zeroth harmonic is the only component which does not change with time. All other components change with time.

The present method was tested with 200 samples from a database. The carrier frequency of the samples in the database was known, therefore providing a mechanism to test the present invention. Three second segments of these files were randomly selected, and each of these segments was frequency translated by a carrier offset in one Hertz increments from −100 Hz to 100 Hz, making a total of 40,200 tests on 200 independent datasets. The CIF surface, equation 3, was computed using a 40 ms Hanning window and a one sample delay. The five largest peak values were used to compute the double correlation, and ten correlation peaks were retained from each correlation. All correlation peaks from the three-second segment were pooled and phase re-parameterized. The carrier offset was estimated as the argument of the strongest pooled correlation peak. The mean error of all 40,200 tests was 1.25 Hz, with a standard deviation of 2.25 Hz, and a maximum error of 5 Hz. In each of the tests, the largest bulge, after re-parameterizing by phase, of equation (26) occurred at the correct carrier offset, as shown in FIG. 6. The estimated error was independent of carrier offset.

While the preferred embodiments of the invention have been illustrated and described, it will be apparent to those of ordinary skill in the art that various changes and modifications may be made without deviating from the inventive concepts set forth above.

What is claimed is:

1. A method of estimating the carrier frequency of a signal, comprising the steps of:
   a) initializing a time average vector to zero;
   b) select a user-selectable number of time segments;
   c) receiving a signal, said signal divided into said user-selectable time segments;
   d) calculating a spectral peak vector, said spectral peak vector calculated from a spectral estimation process on said user-selectable time segment divided signal;
   e) calculating a first correlation vector on said spectral peak vector, said first correlation vector calculated from a first correlation process;
   f) calculating a second correlation vector, said second correlation vector calculated from said spectral peak vector and said first correlation vector;
   g) appending said second correlation vector to said time average vector;
   h) repeating steps (d) through (g) for each of said user-selectable number of segments of said received signal; and
   i) calculate carrier estimate, said carrier estimate the most commonly occurring frequency in said time average vector.

2. The method of claim 1, wherein said step of calculating a spectral peak vector comprises the steps of:
   a) performing a cross spectrum process, said cross spectrum process producing a cross-spectrum indexed by frequency;
   b) performing a phase re-parameterization on said cross spectrum; and
   c) determining the peak of the phase re-parameterized vector.

3. The method of claim 2, wherein the step of performing a cross spectrum process to produce a cross-spectrum indexed by frequency further comprises:
   a) performing a first Fourier transform on said signal, said Fourier transform producing a Fourier spectrum;
   b) selecting a user-definable time-delay, a portion of said signal time-delayed by said user-definable time-delay;
   c) performing a second Fourier transform on said time-delayed signal;
   d) computing the complex conjugate of said second Fourier transform; and
   e) multiplying said Fourier transform with said conjugate of the second Fourier transform to produce a cross spectrum indexed by frequency, the magnitude of said cross spectrum indexed by frequency approximately equaling the power spectrum of the signal segment, and the argument of the representing the instantaneous frequency.

4. The method of claim 3, wherein the step of calculating the carrier estimate further comprises:
   a) performing a phase re-parameterization on said time average vector;
   b) determining the peak of said phase re-parameterized vector;
   c) select element of said phase re-parameterized vector with the largest magnitude;
   d) estimate the angular frequency of said element of said phase re-parameterized vector with the largest magnitude; and
   e) estimate carrier frequency as $$\text{carrier} = \frac{(\text{sample\_rate} * \text{angular\_frequency} * \text{delay})}{2\pi}$$

where sample_rate is the signal sampling rate, and delay is a user-selectable delay.

5. The method of claim 1, wherein the step of calculating the carrier estimate further comprises:
   a) performing a phase re-parameterization on said time average vector;
   b) determining the peak of said phase re-parameterized vector;
   c) select element of said phase re-parameterized vector with the largest magnitude;
   d) estimate the angular frequency of said element of said phase re-parameterized vector with the largest magnitude; and
   e) estimate carrier frequency as $$\text{carrier} = \frac{(\text{sample\_rate} * \text{angular\_frequency} * \text{delay})}{2\pi}$$

where sample_rate is the signal sampling rate, and delay is a user-selectable delay.

6. The method of claim 1, wherein said step of calculating a spectral peak vector comprises the steps of performing a cross spectrum process, said cross spectrum process producing a cross-spectrum indexed by frequency.

7. A method of estimating the carrier frequency of a signal, comprising the steps of:
   a) initializing a time average vector to zero;
   b) select a user-selectable number of time segments;
   c) receiving a signal, said signal divided into said user-selectable time segments;
   d) calculating a cross spectral surface, the cross spectral surface calculated from a spectral estimation process on the user-selectable time segment divided signal;
   e) calculating a phase re-parameterization;
   f) perform a peak picking operation, the peak picking operation producing a peak average vector;
   g) comparing the magnitude of each element of the peak average vector, and selecting the element with the largest magnitude;
   h) perform a combination first and second correlation process, the combination first and second correlation process are two applications of an outer product;
   i) appending the combined correlation vector to the time average vector and repeating for each of the user-selectable number of time segments; and
   j) calculate carrier estimate, said carrier estimate the most commonly occurring frequency in said time average vector.

* * * * *